(12) United States Patent
Koster et al.

(10) Patent No.: US 9,635,013 B2
(45) Date of Patent: Apr. 25, 2017

(54) SECURE DATA HANDLING BY A VIRTUAL MACHINE

(71) Applicant: KONINKLIJKE PHILIPS N.V., Eindhoven (NL)

(72) Inventors: Robert Paul Koster, Eindhoven (NL); Milan Petkovic, Eindhoven (NL); Mina Deng, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/432,320

(22) PCT Filed: Sep. 9, 2013

(86) PCT No.: PCT/IB2013/058394
§ 371 (c)(1),
(2) Date: Mar. 30, 2015

(87) PCT Pub. No.: WO2014/057369
PCT Pub. Date: Apr. 17, 2014

(65) Prior Publication Data
US 2015/0244710 A1    Aug. 27, 2015

Related U.S. Application Data

(60) Provisional application No. 61/712,887, filed on Oct. 12, 2012.

(51) Int. Cl.
*H04L 29/06* (2006.01)
*G06F 21/44* (2013.01)
(Continued)

(52) U.S. Cl.
CPC ...... *H04L 63/0823* (2013.01); *G06F 9/45558* (2013.01); *G06F 21/44* (2013.01);
(Continued)

(58) Field of Classification Search
CPC ....... G06F 2009/45587; G06F 9/45558; H04L 9/083
See application file for complete search history.

(56) References Cited

U.S. PATENT DOCUMENTS 6,510,523 B1 * 1/2003 Perlman ............... H04L 9/3213
709/225
8,549,592 B2 * 10/2013 Bade ...................... G06F 21/57
713/100

(Continued)

OTHER PUBLICATIONS

Perez, Ronald, Reiner Sailer, and Leendert van Doorn. "vTPM: virtualizing the trusted platform module." Proc. 15th Conf. on USENIX Security Symposium. 2006.*

*Primary Examiner* — Shawnchoy Rahman

(57) ABSTRACT

A system for executing a virtual machine instance is provided. An executing environment (11) is arranged for creating a virtual machine instance (10). The virtual machine instance (10) comprises an instance authorization unit (1) for receiving an instance authorization credential, wherein the instance authorization credential is uniquely associated with the virtual machine instance (10). A data key unit (2) is arranged for generating a request for a data key, based on the instance authorization credential associated with the virtual machine instance (10). A decryption unit (3) is arranged for decrypting a data item (7) based on the data key. A key server system (6) is arranged for issuing keys to a virtual machine instance (10). An instance authorization providing unit (22) is arranged for providing the instance authorization credential to the virtual machine instance (10).

13 Claims, 3 Drawing Sheets

(51) Int. Cl.
  *G06F 21/55* (2013.01)
  *G06F 21/62* (2013.01)
  *H04L 9/08* (2006.01)
  *G06F 9/455* (2006.01)

(52) U.S. Cl.
  CPC ........ *G06F 21/554* (2013.01); *G06F 21/6218* (2013.01); *H04L 9/083* (2013.01); *H04L 63/0457* (2013.01); *H04L 63/061* (2013.01); *H04L 63/065* (2013.01); *G06F 2009/45587* (2013.01); *G06F 2221/2107* (2013.01); *G06F 2221/2111* (2013.01); *G06F 2221/2125* (2013.01); *G06F 2221/2143* (2013.01)

(56) References Cited

U.S. PATENT DOCUMENTS

| | | | |
|---|---|---|---|
| 8,607,067 B1 * | 12/2013 | Janse van Rensburg | H04L 63/0823 713/189 |
| 8,856,544 B2 | 10/2014 | Bosch et al. | |
| 2007/0204166 A1 * | 8/2007 | Tome | H04L 63/0272 713/182 |
| 2009/0300758 A1 | 12/2009 | Hauck et al. | |
| 2010/0169948 A1 | 7/2010 | Budko et al. | |
| 2010/0211782 A1 | 8/2010 | Auradkar et al. | |
| 2011/0296201 A1 | 12/2011 | Monclus et al. | |
| 2012/0042163 A1 | 2/2012 | Goodman et al. | |
| 2012/0054486 A1 | 3/2012 | Lakkavalli et al. | |
| 2012/0110574 A1 * | 5/2012 | Kumar | G06F 9/45558 718/1 |
| 2012/0110651 A1 * | 5/2012 | Van Biljon | G06Q 30/04 726/4 |
| 2012/0173866 A1 | 7/2012 | Ashok et al. | |
| 2012/0204030 A1 | 8/2012 | Nossik et al. | |
| 2013/0018765 A1 * | 1/2013 | Fork | H04L 67/10 705/34 |
| 2013/0291062 A1 * | 10/2013 | Bursell | G06F 12/44 726/4 |
| 2014/0082349 A1 * | 3/2014 | Zarfoss, III | H04L 63/08 713/155 |

\* cited by examiner

SECURE DATA HANDLING BY A VIRTUAL MACHINE

CROSS-REFERENCE TO PRIOR APPLICATIONS

This application is the U.S. National Phase application under 35 U.S.C. §371 of International Application No. PCT/IB2013/058394, filed on Sep. 9, 2013, which claims the benefit of U.S. Provisional Application No. 61/712,887, filed on Oct. 12, 2012. These applications are hereby incorporated by reference herein.

FIELD OF THE INVENTION

The invention relates to executing a virtual machine. The invention further relates to issuing keys to a virtual machine instance.

BACKGROUND OF THE INVENTION

In recent times, cloud computing has become an important paradigm. In cloud computing, computing resources may be rented as a commodity good. In a typical cloud computing model, a cloud provider provides virtual servers running on physical servers. Herein, a virtual server may provide a similar functionality as a physical server to a remote user. A plurality of virtual servers may run on a single physical server, so that less physical servers may be needed. Service providers may provide one or more virtual machine images which may be run on the cloud servers as one or more virtual machine instances.

Protection of data is important for cloud computing. Encryption potentially plays an important role to safeguard protection of data. For example, an encrypted file system may be run on top of a virtual machine's file system. Moreover, Amazon S3, provided by Amazon Web Services, Seattle, Wash., USA, provides Server Side Encryption (SSE) to enable a virtual machine to store data in an encrypted form.

Disk-image encryption is a technique aimed at protecting data at rest—that is, when the system is powered off and the attacker somehow got access to its disks or other external storage, in what is commonly known as an 'offline attack'. A similar attack can be performed on virtual machines (VM), with one important difference: it can be performed even without physical access to the system. If an attacker manages to compromise a virtualization host or hypervisor (locally or remotely), they can then proceed to attack its VM guests. A system called Kernel-based Virtual Machine (Linux KVM) enables the system administrator to protect guests that are not running by encrypting their disk-images, and requiring an encryption passphrase or key to start them.

Porticor Virtual Private Data system (Porticor LTD, Ramat Hasharon, Israel) employs a homomorphic split-key encryption technology, in which each data object, such as a disk or file, is encrypted with a unique key which is split in two: a master key and a specific key. The master key is common to all data objects, and remains the possession of the application owner; while the second specific key is different for each data object and is stored by a virtual key management service. As the application accesses the data store, both parts of the key are used to dynamically encrypt and decrypt the data.

US 2010/0211782 A1 discloses a digital escrow pattern provided for network data services including searchable encryption techniques for data stored in a cloud, distributing trust across multiple entities to avoid a single point of data compromise. In one embodiment, a key generator, a cryptographic technology provider and a cloud services provider are each provided as separate entities, enabling a publisher of data to publish data confidentially to a cloud services provider, and then expose the encrypted data selectively to subscribers requesting that data based on subscriber identity information encoded in key information generated in response to the subscriber requests, e.g., a role of the subscriber.

US 2011/0296201 A1 discloses a method and apparatus configured to provide for the trusted execution of virtual machines (VMs) on a virtualization server, e.g., for executing VMs on a virtualization server. A physical multi-core CPU may be configured with a hardware trust anchor. The trust anchor itself may be configured to manage session keys used to encrypt/decrypt instructions and data when a VM (or hypervisor) is executed on one of the CPU cores. When a context switch occurs due to an exception, the trust anchor swaps the session key used to encrypt/decrypt the contents of memory and cache allocated to a VM (or hypervisor).

SUMMARY OF THE INVENTION

It would be advantageous to have an improved handling of a virtual machine instance. To better address this concern, a first aspect of the invention provides a system comprising an executing environment for creating a virtual machine instance that comprises:

an instance authorization unit for receiving an instance authorization credential, wherein the instance authorization credential is uniquely associated with the virtual machine instance;

a data key unit for generating a request for a data key, based on the instance authorization credential associated with the virtual machine instance; and a decryption unit for decrypting a data item based on the data key.

The instance authorization credential provides a virtual machine instance with a way to identify itself, because the instance authorization credential is uniquely associated with the virtual machine instance. This way, the request for the data key can be recognized as originating from the virtual machine instance, and this way an entity external to the virtual machine instance may determine, based on the request, if a data key may be issued to the virtual machine instance, and, for example, which data key of a plurality of available data keys may be issued to the virtual machine instance.

The virtual machine instance may further comprise a user credential unit for obtaining a user credential associated with a user or a group of users. This way, the virtual machine instance has both an instance authorization credential associated with the virtual machine instance as well as a user credential associated with a user or a group of users. The data key unit may be arranged for generating the request further based on the user credential. This allows the receiver of the request to identify both the virtual machine instance and the user, so that the receiver of the request may determine whether to provide a particular data key based on both entities. Alternatively, the decryption unit may be arranged for decrypting the data item further based on the user credential. This way, the user credential may be used in conjunction with the data key to decrypt the data. Either way, the virtual machine instance needs both the user credential and the instance authorization credential to gain access to the data item in its unencrypted form.

The instance authorization unit may be arranged for issuing a request for the instance authorization credential, wherein the request is indicative of at least one attribute that is specific to the virtual machine instance. This allows the virtual machine instance to actively request an instance authorization credential. The at least one attribute may be, for example, a set of attributes that together uniquely identify the virtual machine instance.

The system may further comprise an instance owner unit for registering an authorization code associated with the virtual machine instance at a key server and providing the authorization code to the virtual machine instance; wherein said at least one attribute comprises the authorization code. This allows the owner unit to control the decryption capabilities of the virtual machine instance.

The instance owner unit may be arranged for sending an instruction comprising the authorization code to an executing environment of virtual machines. The executing environment may be arranged for creating the virtual machine instance and providing the authorization code to the virtual machine instance in response to receiving the instruction. This allows the instance owner to cause the executing environment to create a virtual machine instance with the decryption capabilities associated with the authorization code.

The instance owner unit and the execution environment may be implemented on two separate hardware entities connected by means of a network. The system allows to improve trust in a virtual machine instance that is operated by an instance owner unit from a remote location via a network, by controlling the authorization code provided to the virtual machine instance and/or the data keys issued to the virtual machine instance.

The data key unit may be arranged for including in the request for the data key a code that is indicative of the position of the request in a sequence of requests issued by the virtual machine instance. This allows to detect an illegal copy of a virtual machine instance, because when two virtual machine instances use the same instance authorization credential, this may be revealed by the code indicative of the position of the request in the sequence of requests issued by the virtual machine instance. In particular, a not strictly increasing position in subsequent requests may be detected.

The virtual machine instance may be arranged for keeping the data key and the data decrypted using the data key in a volatile memory and/or erasing the data key and data decrypted using the data key after use. This prevents that the data key and/or the data item are stored on a permanent memory and/or are present in memory for a longer duration than necessary.

In another aspect of the invention, a key server system is provided for issuing keys to a virtual machine instance, the key server system comprising an instance identifying unit for identifying a virtual machine instance based on at least one attribute that is specific to the virtual machine instance;

an instance authorization determiner for determining an instance authorization credential, and uniquely associating the instance authorization credential with the virtual machine instance;

an instance authorization providing unit for providing the instance authorization credential to the virtual machine instance;

a data key request receiver for receiving a request for a data key from the virtual machine instance, wherein the request for the data key comprises an instance authorization component associated with the instance authorization credential;

a data authorization unit for determining whether the virtual machine instance is authorized to receive the data key based on the instance authorization component; and a data key providing unit for providing the data key to the virtual machine instance if the virtual machine instance is authorized to receive the data key.

The key server system may control distribution of a data key to a virtual machine instance. Because of the attribute that is specific to the virtual machine instance, and the subsequent issuing of an instance authorization credential that is uniquely associated with the virtual machine instance, the authentication of the virtual machine instance is made more secure, as well as the authorization process. Moreover, 'illegal' virtual machine instances may be rendered useless, as they may not be given an instance authorization credential, so that they cannot generate a valid request for a data key. The data authorization unit may use one or more policies to determine whether a virtual machine instance is authorized to receive a data key. Such a policy may indicate what is allowed and not allowed, may be static or dynamic, and may depend on properties of the data, aforementioned attributes and elsewhere mentioned associated users and/or location. The at least one attribute may be, for example, a set of attributes that together uniquely identify the virtual machine instance.

The key server system may further comprise an instance credential request receiver for receiving a request for the instance authorization credential from the virtual machine instance, wherein the request is indicative of the attribute that is specific to the virtual machine instance; and an instance validation unit for verifying a validity of the virtual machine instance based on the attribute. This allows the virtual machine instance itself to request the virtual machine instance authorization credential. Using the attribute that is specific for the virtual machine instance, it becomes possible to identify the virtual machine instance to the key server system.

The instance validation unit may be arranged for performing the verifying of the validity of the virtual machine instance further based on an attribute indicative of a location of the virtual machine instance, or the data authorization unit is arranged for performing the determining whether the virtual machine instance is authorized to receive the data key further based on the location of the virtual machine instance. This allows to monitor the location of the virtual machine instance, and deny the instance authorization credential or the data key to a virtual machine instance that is not at an appropriate location. The location of a virtual machine instance may be, for example, the location of a physical device comprising a processor and/or a memory and/or a storage, on which the virtual machine instance is executed.

The request for the data key may be further indicative of a user credential that is associated with a user or a group of users of the virtual machine instance. The data authorization unit may be arranged for performing the determining whether the virtual machine instance is authorized to receive the data key further based on the indication of the user credential received with the request for the data key and an access policy of the data protected by the data key. This way, the data key is only provided to an authorized virtual machine instance, and only if the virtual machine instance has possession of the appropriate user credential.

The key server system may comprise a log unit for logging information relating to communications pertaining to authorization requests, credentials, and/or data keys. Such logging information may be used to perform analysis of past events, to detect any possible patterns indicative of abuse, for example.

In another aspect, the invention provides a virtual machine image capable of being instantiated as a virtual machine instance, wherein the virtual machine image comprises:

instruction code for causing the virtual machine instance to receive an instance authorization credential, wherein the instance authorization credential is uniquely associated with the virtual machine instance;

instruction code for causing the virtual machine instance to generate a request for a data key, based on the instance authorization credential associated with the virtual machine instance; and instruction code for causing the virtual machine instance to decrypt a data item based on the data key.

In another aspect, the invention provides a method of executing a virtual machine instance, the method comprising, by the virtual machine instance:

receiving an instance authorization credential, wherein the instance authorization credential is uniquely associated with the virtual machine instance;

generating a request for a data key, based on the instance authorization credential associated with the virtual machine instance; and decrypting a data item based on the data key.

In another aspect, the invention provides a method of issuing keys to a virtual machine instance, comprising identifying a virtual machine instance based on at least one attribute that is specific to the virtual machine instance;

determining an instance authorization credential, and uniquely associating the instance authorization credential with the virtual machine instance;

providing the instance authorization credential to the virtual machine instance;

receiving a request for a data key from the virtual machine instance, wherein the request for the data key comprises an instance authorization component associated with the instance authorization credential;

determining whether the virtual machine instance is authorized to receive the data key based on the instance authorization component; and providing the data key to the virtual machine instance if the virtual machine instance is authorized to receive the data key.

In another aspect, the invention provides a computer program product comprising instructions for causing a processor system to perform any method set forth herein.

It will be appreciated by those skilled in the art that two or more of the above-mentioned embodiments, implementations, and/or aspects of the invention may be combined in any way deemed useful.

Modifications and variations of the system, virtual machine instance, key server system, the methods, and/or the computer program product, which correspond to the described modifications and variations of the system, can be carried out by a person skilled in the art on the basis of the present description.

BRIEF DESCRIPTION OF THE DRAWINGS

These and other aspects of the invention are apparent from and will be elucidated hereinafter with reference to the drawings. In the drawings, similar items have been indicated by the same reference numerals.

DETAILED DESCRIPTION OF EMBODIMENTS

A virtual machine may be regarded as an isolated guest operating system installation within a normal host operating system or dedicated hypervisor. For example, the virtual machine may be implemented with either software emulation or hardware virtualization. Both software emulation and hardware virtualization may be implemented together. The software running inside a virtual machine may be limited to the resources and abstractions provided by the virtual machine—it cannot break out of its virtual environment. Although originally, virtual machines were aimed at providing an efficient, isolated duplicate of a real machine. However, current use of virtual machines includes virtual machines which have no direct correspondence to any real hardware.

A virtual machine instance may have a type definition including, for example, a virtual machine image that defines the data contained in a virtual machine at the start of the execution of the virtual machine. The actual virtual machine, as it is executed in an execution environment, may be distinguished from the type definition of a virtual machine by the term virtual machine instance.

Figure 1:
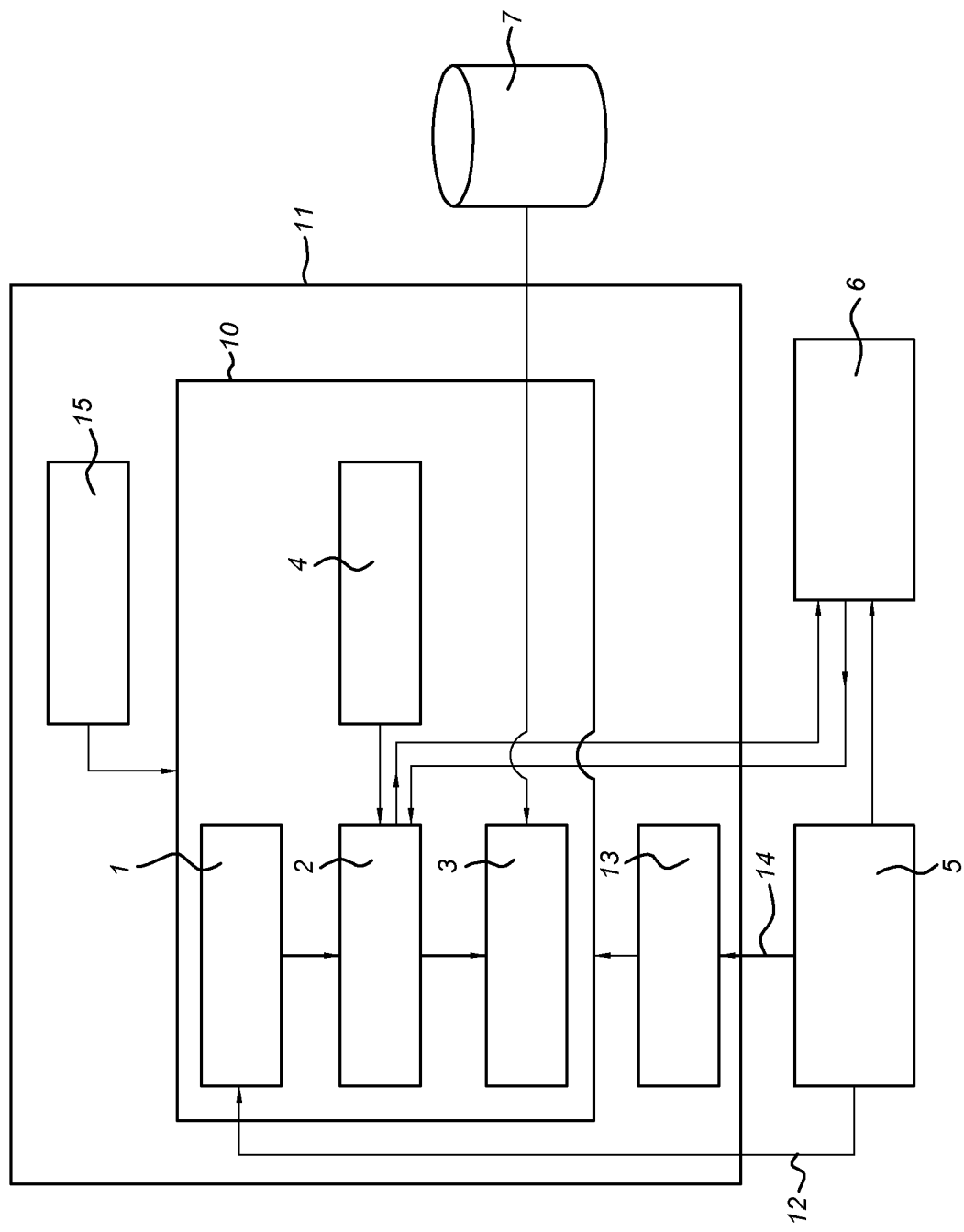
FIG. 1 is a block diagram of an executing environment in which a virtual machine instance may be executed.

FIG. 1 illustrates aspects of a system for executing a virtual machine instance 10. The system may comprise an executing environment 11 that controls execution of the virtual machine instance 10. The executing environment 11 may be arranged for controlling execution of a plurality of virtual machine instances 10, which may be operative on a distributed computer system. The system may comprise an instance creator 15, which may be part of the executing environment 11, as shown in FIG. 1, or it may be arranged as a unit separate of the executing environment 11. The instance creator 15 may create the virtual machine instance 10, for example, based on a virtual machine image (not shown) that defines the instruction code of the virtual machine. The instance creator 15, possibly in conjunction with a virtual machine image, may be operative to create one or more virtual machine instances 10, in such a way that the virtual machine instance 10 includes several instruction codes. Instruction codes that collectively are responsible for a particular functionality may be referred to as a unit. Such units may be logically arranged in software modules; however, they may also be divided over a plurality of software modules.

The virtual machine instance 10 may comprise an instance authorization unit 1 arranged for receiving an instance authorization credential. This instance authorization credential may be created externally of the virtual machine instance, by an authorized entity. Moreover, the instance authorization credential may be uniquely associated with the virtual machine instance 10. This means that the same authorization credential is not provided to any other virtual machine instance 10.

The virtual machine instance may further comprise a data key unit 2 arranged for generating a request for a data key, based on the instance authorization credential associated with the virtual machine instance 10. For example, the authorization credential may be included in the request, or a proof that the virtual machine possesses the authorization credential may be included in the request. The request may further be indicative of one or more data items, for example content items or secured patient record items, which data items may be encrypted. The request may entail a request for a data key for that one or more data items.

The data key unit 2 may further be arranged for receiving the data key that may be sent to the virtual machine instance 10 in response to the request.

The virtual machine instance may further comprise a decryption unit 3 arranged for decrypting the data item 7 based on the data key. For example, the data item 7 is retrieved from an external database in an encrypted form. The manner in which the virtual machine instance gains access to the encrypted data item 7 may be any way known to the person skilled in the art. For example, the encrypted data item 7 may be retrieved via a database interface or via a file system. Any suitable encryption algorithm can be used.

The virtual machine instance 10 may further comprise a user credential unit 4 arranged for obtaining a user credential associated with a user or a group of users, and wherein the data key unit 2 is arranged for generating the request further based on the user credential or the decryption unit 3 is arranged for decrypting the data item 7 further based on the user credential. Either way, this adds a user authentication method to the virtual machine authentication method described above. The user credential may be used to ensure that only authorized users may get access to restricted data. The instance authorization credential may be used to ensure that such authorized access only takes place through authorized virtual machine instances. This way, unauthorized (and potentially malicious) virtual machine instances, even if they manage to obtain a user credential, cannot be used to obtain unauthorized access to the restricted data, because of the lacking instance authorization credential.

The instance authorization unit 1 may be arranged for issuing a request for the instance authorization credential, wherein the request is indicative of at least one attribute that is specific to the virtual machine instance. For example, the request may be sent to a server that is responsible for providing the instance authorization credential. The attribute may be indicative of, for example, a time of creation of the instance, or a process ID, network address, and other kinds of parameters that (together) may identify the virtual machine instance. The "at least one attribute that is specific for the virtual machine instance" may be a set of values that together are specific or uniquely identify the virtual machine instance.

In one example implementation, the system may include an instance owner unit 5 for registering an authorization code associated with the virtual machine instance 10 at a key server system 6 and providing the authorization code to the virtual machine instance 10. The instance authorization unit 1 may be arranged for including an attribute indicative of the authorization code in the request for the instance authorization credential.

The instance owner unit 5 may be arranged for sending an instruction comprising the authorization code to an executing environment 11 of virtual machines, and wherein the executing environment 11 is arranged for creating the virtual machine instance 10 and providing the authorization code to the virtual machine instance 10 in response to receiving the instruction. For example, the instance owner unit 5 may be arranged for sending the instruction comprising the authorization code to a control unit 13 of the execution environment 11, as indicated with arrow 14. The control unit 13 then cooperates with the instance creator 15 to create the virtual machine instance 10 and provide it with the authorization code. Alternatively, the instance owner unit 5 may be arranged for sending the authorization code to the instance authorization unit 1 of the virtual machine instance 10, as indicated with arrow 12 in FIG. 1.

The executing environment 11 may alternatively be arranged for providing the instance authorization credential to the virtual machine instance 10 automatically when it creates the virtual machine instance 10, and negotiating with the key server system 6 about what instance authorization credential to use.

The data key unit 2 may be arranged for including in the request for the data key a code that is indicative of a position of the request in a sequence of requests for data keys issued by the virtual machine instance 10. By using a numbering of key requests, it may be detected when more entities, for example more than one virtual machine instance, are using the same instance authorization credential. The code may comprise a sequence number for example. This sequence number may be encrypted or a hash code or signature of the sequence number could be used to enhance the security, for example.

The virtual machine instance 10 may be arranged for keeping the data key and/or data decrypted using the data key in a volatile memory and/or erasing the data key and the data decrypted using the data key after use. This way, the restricted data is not kept inside the executing environment 11 longer than needed for immediate use. If the data item 7 is needed again, the data key may be requested again.

Figure 2:
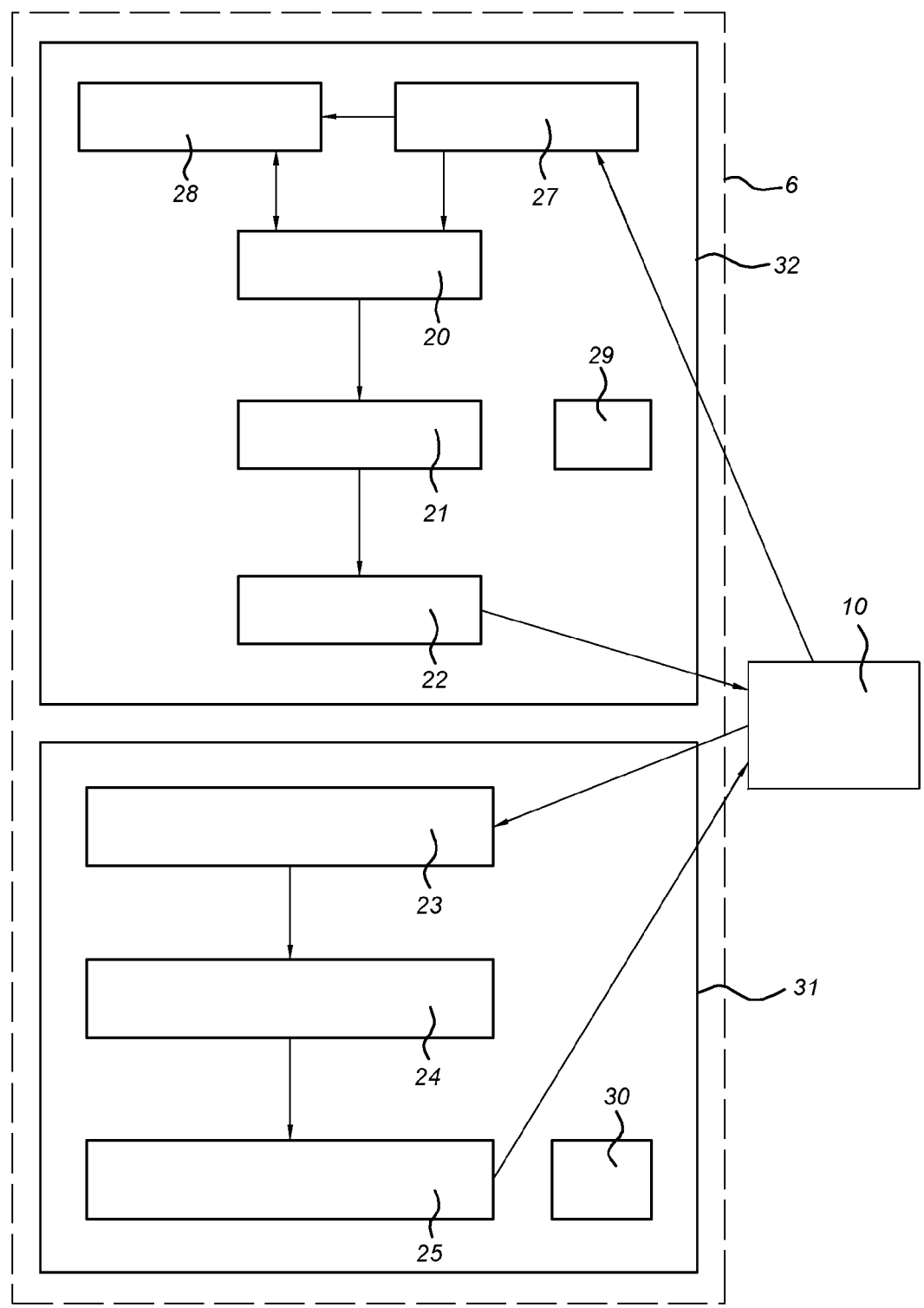
FIG. 2 is a block diagram of a key server system.

FIG. 2 illustrates a key server system 6 for issuing keys to the virtual machine instance 10. The key server system 6 and/or the executing environment 11 could be implemented on the same or a distinct server system.

The key server system may comprise an instance credential issuer 32 comprising the modules responsible for issuing an instance authorization credential. Moreover, the key server system may comprise a data key issuer 31 comprising the modules responsible for issuing data keys. This is illustrated in FIG. 2. However, this is only an example, non-limiting, architecture of an implementation of the key server system 6.

The key server system 6 may comprise an instance identifying unit 20 arranged for identifying a virtual machine instance 10 based on at least one attribute that is specific to the virtual machine instance 10. For example, the key server system may maintain a table that contains one or more representative attributes for each virtual machine instance 10.

The key server system 6 may further comprise an instance authorization determiner 21 arranged for determining an instance authorization credential. For example, the instance authorization determiner 21 may be arranged for generating the instance authorization credential, for example using a pseudo random number generator, in particular a cryptographically secure pseudo random number generator. The instance authorization credential may, for example, be indicative of a cryptographic key. The instance authorization determiner may be arranged for uniquely associating the instance authorization credential with the virtual machine instance 10. This may be implemented, for example, by means of the above-mentioned table. Other implementations, such as using a database, are within reach of the person skilled in the art.

The key server system 6 may comprise an instance authorization providing unit 22 arranged for providing the instance authorization credential to the virtual machine instance 10. For example, the credential is delivered to the virtual machine instance 10 using a communication protocol.

The key server system 6 may further comprise a data key request receiver 23 arranged for receiving a request for a data key from the virtual machine instance 10. The request for the data key may comprise an instance authorization component associated with the instance authorization credential. This component may have any suitable form, such as a separate data element, or a specific transformation of another data element of the request, such as a cryptographic signature.

The key server system 6 may further comprise a data authorization unit 24 arranged for determining whether the virtual machine instance 10 is authorized to receive the data key based on the instance authorization component. This functionality may entail verifying a cryptographic key associated with the instance authorization component.

The key server system 6 may further comprise a data key providing unit 25 arranged for providing the data key to the virtual machine instance 10 if the virtual machine instance 10 is authorized to receive the data key, as determined by the data authorization unit 24.

The key server system 6 may further comprise an instance credential request receiver 27 arranged for receiving a request for the instance authorization credential from the virtual machine instance 10. The request may be indicative of the attribute that is specific to the virtual machine instance 10.

The key server system 6 may further comprise an instance validation unit 28 arranged for verifying a validity of the virtual machine instance 10 based on the indication of the attribute received by the instance credential request receiver 27.

The instance validation unit 28 may be arranged for performing the verifying of the validity of the virtual machine instance 10 further based on an attribute indicative of a location of the virtual machine instance 10. Moreover, the data authorization unit 24 may be arranged for performing the determining whether the virtual machine instance 10 is authorized to receive the data key further based on the location of the virtual machine instance 10.

The request for the data key may be further indicative of a user credential that is associated with a user or a group of users of the virtual machine instance 10. Moreover, the data authorization unit 24 may be arranged for performing the determining whether the virtual machine instance 10 is authorized to receive the data key further based on the indication of the user credential received with the request for the data key and an access policy of the data protected by the data key.

The key server system 6 may further comprise a log unit 29, 30 for logging information relating to communications pertaining to authorization requests, credentials, and/or data keys. Logging may be performed by the instance credential issuer 32 and by the data key issuer 31 alike. This may be performed by a single log unit or two separate log units 29, 30.

Figure 3:
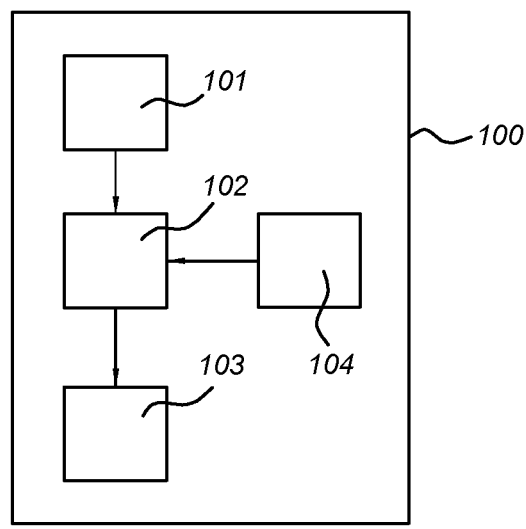
FIG. 3 is a block diagram of a virtual machine image.

FIG. 3 illustrates components of a virtual machine image 100. The virtual machine image 100 may provide a definition of a virtual machine. The executing environment 11 may be arranged for creating a virtual machine instance 10 based on the virtual machine image 100. The virtual machine image may comprise instruction code 101 for causing the virtual machine instance 10 to receive an instance authorization credential, wherein the instance authorization credential is uniquely associated with the virtual machine instance 10; instruction code 102 for causing the virtual machine instance 10 to generate a request for a data key, based on the instance authorization credential associated with the virtual machine instance 10; and/or instruction code 103 for causing the virtual machine instance 10 to decrypt a data item based on the data key. This virtual machine image 100 may be extended and/or modified by the skilled person based on the descriptions and figures relating to, inter alia, the virtual machine instance 10, in the present disclosure.

Figure 4:
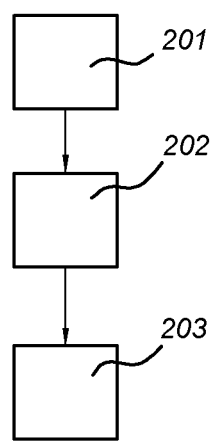
FIG. 4 is a flowchart of a method of executing a virtual machine instance.

FIG. 4 illustrates a method of executing a virtual machine instance. The virtual machine may perform the following steps during its execution:

receiving 201 an instance authorization credential, wherein the instance authorization credential is uniquely associated with the virtual machine instance;

generating 202 a request for a data key, based on the instance authorization credential associated with the virtual machine instance; and/or decrypting 203 a data item based on the data key.

Figure 5:
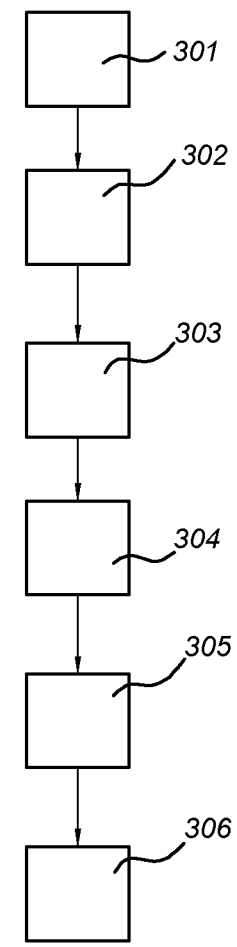
FIG. 5 is a flowchart of a method of issuing keys to a virtual machine instance.

FIG. 5 illustrates a method of issuing keys to a virtual machine instance. The method may comprise the following steps:

identifying 301 a virtual machine instance based on at least one attribute that is specific to the virtual machine instance;

determining 302 an instance authorization credential, and uniquely associating the instance authorization credential with the virtual machine instance;

providing 303 the instance authorization credential to the virtual machine instance;

receiving 304 a request for a data key from the virtual machine instance, wherein the request for the data key comprises an instance authorization component associated with the instance authorization credential;

determining 305 whether the virtual machine instance is authorized to receive the data key based on the instance authorization component; and/or providing 306 the data key to the virtual machine instance if the virtual machine instance is authorized to receive the data key.

These methods may be extended and/or modified by the skilled person based on the descriptions and figures of the present disclosure. Moreover, the methods and systems disclosed herein may be implemented at least partly in form of a computer program product.

The techniques disclosed herein may be used to address one or more issues relating to security of virtual machines, for example in cloud computing. For example, fatality of a single point of failure may be avoided, for example by providing built-in separation of duty and security partitioning. The protection may be made more data-centric, and more fine-grained. Moreover, key management may be improved.

Unauthorized access to a virtual machine instance or loss or theft of a virtual machine image can lead to a significant breach of confidentiality of associated data with no control left to the data owner who outsourced computing to the 'cloud'. This problem may be reduced using the techniques disclosed herein. Data may be encrypted and a method for a virtual machine instance to request a key for encrypted data objects from an external key service may be provided. This may separate the responsibilities over two parties instead of the situation in which security depends on the strength of an individual party that has access to both data and keys, such as the cloud user and/or the cloud provider with its execution environment for virtual machines.

A method to dynamically obtain data decryption keys by a cloud virtual machine instance may include the steps of 1) a cloud virtual machine instance obtains a unique identity and authorization, 2) the cloud virtual machine instance requests a key for an encrypted data object at a key service, 3) the key service processes the request, evaluates whether the virtual machine is authorized, and in case of positive evaluation responds with the key for the data objects.

The techniques disclosed herein allow data to remain in encrypted form almost permanently while decryption keys are maintained somewhere else. The keys to decrypt the data may be only issued to specified, authorized virtual machines. Data may be only available in unencrypted form at the moment it is processed. Decrypted data may be deleted as soon as it is not necessary anymore. Keys are issued on a temporary basis and may be only kept in memory and do not need to be stored persistently. Such refraining from persistent storage may be enforced by the executing environment 11.

In the following a number of embodiments are presented. These embodiments are illustrated by means of communication exchange sequences, denoted by means of a number of interaction tables shown below. The interaction tables use the following notation: "source—[message (parameter, . . . )]→destination". This notation means that an entity "source" sends a message of a type indicated by "message" and with parameters "parameter, . . . " to another entity "destination", which receives the message. Such a communication of a message may take the form of a message, web service invocation, API call, or any other communication protocol.

Data objects that are to be used in the virtual machine instance may be encrypted. Data objects may be any type of data such as numeric and text values, database cells, files and even file systems. When these data objects are to be used the correct decryption key is requested by the virtual machine instance from a key server. This server may be hosted independently of the virtual machine instance in order to increase security. Table 1 illustrates different steps that may be involved in an encryption system for virtual machines.

TABLE 1 interaction diagram instantiation, personalization, key retrieval 1. serviceProvider -[createInstance( )]→ cloudManagementServer
2. cloudManagementServer -[createInstance(VMimage)]→ cloudServer
3. VMinstance -[personalisationRequest(VMinstanceAttributes, f(VMimageKey))]→ keyServer
4. keyServer -[personalizationResponse(VMinstanceIdentity, VMinstanceKey)]→ VMinstance
5. VMinstance -[keyRequest(dataID, h(VMinstanceKey))]→ keyServer
6. keyServer -[keyResponse(dataKey)]→ VMinstance Typically, a serviceProvider may provide an interface to a human or an entity controlling creation of new instances. The serviceProvider thus issues a command to a cloudManagementServer to create the instance. The cloudManagementServer may be hosted by a third party, for example, that provides computing resources as a service. The cloudServer may be a server system on which the virtual machine is executed. VMinstance means virtual machine instance, and VMimage means virtual machine image. Steps 1 and 2 of Table 1 create and start a virtual machine instance from the virtual machine image. The steps may be initiated by the service provider, which instructs the cloudManagementServer to instantiate the virtual machine image on the cloudServer. The virtual machine image (VMimage) contains the application of the service provider. The result of steps 1 and 2 is a running instance of the image on the cloud server.

Steps 3 and 4 personalize and authorize the virtual machine instance. Because the virtual machine image may be instantiated multiple times which leads to multiple identical instances, steps 3 and 4 provide the personalization that is used for security to differentiate between instances. This applies in particular to the key server which should precisely know to which instance it sends decryption keys. It may address risks such as unauthorized instantiation of virtual machine images by malicious insiders or outsiders. It reduces the risk that an attacker remains undetected. The VMinstance sends in step 3 a set of one or more attributes that uniquely identify the VMinstance to the keyServer. The set of attributes may include, optionally, an identification of the image used to create the VMinstance. The VMinstance further sends in step 3 a key VMimageKey that is associated with the VMimage (wherein f denotes any predetermined function), to the keyServer. In step 4, the keyServer replies with an optional indication of identity of the instance and an instance key (VMinstanceKey). As is described hereinabove, this identity and key may be replaced with any suitable virtual machine image authorization credential.

To personalize the virtual machine instance, the instance includes a number of attributes that potentially can be used to differentiate the instance from other instances. Example attributes to identify an instance include the public IP address, image ID used to launch the instance, and the ID of the instance. Authorization of instances may ensure that only legitimate instances obtain access to decryption data keys. For the purpose of authorization, instances use, for example, a virtual machine image key. In step 3 the key is used to sign the personalization request where f( ) represents, in this case, the signing function. This signature is part of the set of attributes specific to the virtual machine instance. The key server optionally verifies that an authorized image key is used as part of the process to authorize the VM instance. It also performs some checks for the other provided attributes. The attributes enable practical personalization as they allow to distinguish between virtual machines. The attributes may also be used in the authorization process to authorize the VM instance next to the image key. If the verifications and checks are positive, the key server responds in step 4 with an identity for the instance to be used in subsequent interactions and an instance key to prove it is authorized and to be practically used to secure (e.g. sign, authenticate, decrypt, etc.) subsequent interactions. The instance identity and instance key serve as authorization credentials in later requests. Other kinds of authorization credentials may also be used.

Steps 5 and 6 retrieve the data key to enable decryption of the data. The virtual machine instance requests the key for the particular data object by identifying it through dataID. The virtual machine instance also presents its authorization credentials, which e.g. comprises the instance identity and signature created from the instance key (denoted with h( ) in step 5). The key server evaluates the request and after positive evaluation responds to the request with the data key.

Once the virtual machine instance has obtained the decryption key, it can decrypt the data object and process it. The instance should delete the decrypted data when it does not need it anymore.

The instance may be configured to hold all keys and decrypted data in memory and prevent that these are swapped out to disk by using features provided by the operating system. Furthermore, key and data lifetimes should be limited. Decrypted data and data keys should expire when they are not necessary anymore. Instance keys are disposed after the instance stops running.

In a modification of step 5, the step includes a user credential of a user of the virtual machine instance to further control access to decryption keys based on user-dependent authorization, so that step 5 in Table 1 above is replaced by:

5.  VMinstance—[keyRequest(dataID, h(VMinstanceKey), h(userKey))]→keyServer

This further constrains the distribution of decryption keys to authorized users of a particular virtual machine and as such increase security and trust. In particular user-dependent authorization fits well with the many cases where data is associated to particular users. The decryption key is then only distributed to VM instances if such an authorized user is associated to the VM instance.

Data may be associated to particular users in various ways. A direct association between a user identity and data may be provided because the user is the subject of the data or because the user is a designated user of the data according to the policy governing the data. Data-user associations may also be indirect through the use of roles and attributes. This way a user holding a particular role may be authorized to access data, enforced by the key server. In the case of role-based and attribute-based data-user associations, instead of a single user, a group of users may be associated with the data.

Users may be associated to a VM instance through authentication to the VM instance. For example, a user may be logging-in to a web-site hosted on the virtual machine instance. Such authentication sessions may be short or long living. When the user logs off or when the authentication session ends by other means such as expiration then the VM instance deletes keys associated to that user which it obtained from the key server. This effectively ends the user-dependent authorization.

User-dependent authorization involves inclusion of a user credential (depicted as h(userKey) in the example above) such as a signature based on a user key, authentication token, or authentication assertion. Such credential may be obtained as part of the user authentication process.

In another modification, user-dependent authorization also involves a user-dependent data key. In one embodiment the VM instance receives in step 6 dataKey in an encrypted form, and decrypts this encrypted dataKey with the user-dependent key, which results in a key to decrypt the data. In another embodiment this is left to the key server. A separate key server may be responsible for management of the user-dependent keys.

Another example prevents e.g. direct attack of the virtual machine image, e.g. unauthorized cloning, theft, or unauthorized instance creation. An explicit authorization is introduced as part of creating/starting a virtual machine instance from an image. The following steps 0-3 may replace steps 1-3 in Table 1 above:

TABLE 2 interaction diagram instance authorization 0.  serviceProvider -[registerInstance(authorizationCode)]→ keyServer
1.  serviceProvider -[createInstance(authorizationCode)]→ cloudManagementServer
2.  cloudManagementServer -[createInstance(VMimage, authorizationCode)]→ cloudServer
3.  VMinstance -[personalisationRequest(VMinstanceAttributes, VMimageKey, authorizationCode)]→ keyServer Step 0 pre-authorizes the instance that is to be started by the service provider that registers an authorization code at the key server. Steps 1 and 2 subsequently create the instance. All of these steps include an authorizationCode. This authorization code is created by a service provider, e.g. by generating the authorization code randomly. The authorization code is provided to the virtual machine image on creation by the cloud server, for example. At step 3 this authorization code is included in the personalization request after which the key server verifies that the authorization code obtained from the virtual machine instance is identical to the authorization code received directly from the service provider. Only if these codes are identical, the key server issues an instance authorization credential. This example may also enhance a so-called hypervisor to allow passing of the authorizationCode parameter from a management interface to a virtual machine instance.

A simpler alternative does not use an authorizationCode, but instead allows for a predefined maximum amount of time T between step 0 and step 3 as measured by the key server to assume that the creation of the instance is legitimate and authorized.

In a variant a serviceProvider can also completely prevent further instantiations of a virtual machine image by explicitly signaling to the key server not to personalize new instances by means of the following interaction:

TABLE 3 interaction diagram lock images a.  serviceProvider -[lock(VMimage)]→ keyServer

In an enhanced example, a further protection against unauthorized cloning of running virtual machine instances is provided. This enhancement involves including a sequence number in step 5 of Table 1:

TABLE 4 interaction diagram sequence numbers

5.  VMinstance -[keyRequest(dataID, sequenceNumber)]→ keyServer

This step 5 comprises the inclusion of an indication of a sequence number by the virtual machine instance in key requests to the key server. The VM instance increases or otherwise updates the sequence number after each request in a manner consistent with a corresponding sequence number implemented in the key server. The key server may verify that the sequence numbers from an instance are received in a strict increasing order. This allows the key server to detect a cloned instance, which cannot guess sequence numbers used by the original and therefore will be detected once it makes an attempt to request keys.

In another enhanced example, cloning of running virtual machine instances is prevented by explicitly locking instances after running them. This involves the following additional steps:

TABLE 5 interaction diagram lock instances b.  serviceProvider -[lock(VMinstance)]→ cloudManagementServer
c.  cloudMangementServer -[lock(VMinstance)]→ cloudServer Steps b and c can be invoked at any time, for example directly after steps 1 and 2 of Table 1. The lock instruction sends a signal to the cloud (management) server not to allow any future instruction to make a snapshot of the running instance, e.g. by an administrator of the cloud provider, the service provider, and possibly malicious outsider.

The key server may be arranged for logging some kinds of interactions or even all interactions, e.g. instance registrations, personalization requests and key requests. The key server may offer access to this log to the service provider, which contributes to transparency and traceability. The key server may also automatically analyze the logs for patterns and anomalies that may hint at attacks and attack attempts. Finally, the key server may offer assisted or automated means to service providers to control how its applications are run on the cloud. In an alternative example, the key server logs to a remote logging server instead of logging it locally. In this alternative embodiment the logging related functionalities may be offered by this logging server. The logging facilities may protect the integrity of the logging information to ensure the logging information has not been tampered with.

In another example modification, the key server is provisioned with additional functionality in order to enable traceability and control of data object access and usage by taking into account the location of the virtual machine instance and data. This enables, among others, compliance with certain privacy legislations, e.g. EU Privacy Directive, which mandates that data is only stored and processed in certain countries and/or jurisdictions.

For example, the key server keeps track of the location information of objects. This can be realized by verifying or requesting location information of the requesting virtual machine instance. Another example is that the key server processes key requests such that it only honors key requests that originate from certain locations, i.e. virtual machine instances that have a known and allowed location for the data in question. Where data may be used may be expressed in policies. The location of a VM instance may be, for example, the geographic location of a server on which the VM instance is hosted.

Different methods may be used for the key server to obtain the location information of the virtual machine and/or data:

A (static) database with locations of virtual machine instances and the servers that host the instances. The instance and/or server may be identified e.g. by their IP address.

Binding (dynamically) location information to a virtual machine instance (or data object) via a mechanism similar to certified time-stamping, which may be issued by a Trusted Location Authority in the cloud. For instance, this Trusted Location Authority can be a management controller in the cloud infrastructure that manages location information of all virtual machine instances and/or data in the cloud.

The key server regularly (e.g. once a day) receives a number of certified location stamps from the data objects with an authentication tree indicating the path of the object in the cloud. For instance, the authentication tree can be computed using a hash tree with a root, and it is verifiable by another party.

This example allows verifiable authenticity and tractability of an object's location in the cloud. The first two methods may be combined with step 3 (personalization) or step 5 (key request) of Table 1 to inform the key server about the location of the requesting virtual machine instance to obtain an efficient and secure realization.

In another example, the VM instance does not generate and issue the request for the instance authorization credentials based on the attributes. Instead, the key server is provided with an instruction from another entity to issue an instance authorization credential:

TABLE 5

Authorization setup performed by an administrator user 3. administrator -[authorizationCredentialRequest(attributes)]→ keyServer
4. keyServer
-[authorizationCredentialResponse(authorizationCredential)]→
administrator
4a. administrator
-[provisionAuthorizationCredential(authorizationCredential)]→
VMinstance Herein, steps 3, 4, and 4a of Table 5 may replace, for example, steps 3 and 4 of Table 1. The messages originally labeled personalizationRequest/personalizationResponse have been renamed authorizationCredentialRequest/authorizationCredentialResponse here. The administrator may access the key server through a portal and request an authorization credential for the new virtual machine instance. As part of this request the administrator may generate or enter some details such as a unique identifier for the new instance (denoted by 'attributes' in above interaction table 5). After processing the request, the key server may create a unique code, which is sent to the administrator. The code serves the purpose of the authorization credential. The administrator subsequently configures the virtual machine instance in step 4a with the authorization credential in order to authorize the virtual machine instance.

A good example of an instance authorization credential used in the above-described schemes comprises an instance key. The holder of the instance key obtained from the key server uses the instance key to prove that the VM instance possesses the key and thereby that the VM instance is authorized. Sending a key or other credential in unencrypted form may impose a security weakness. Therefore, the instance key or other instance credential may be digitally protected when used. For example, this protection may be done through a keyed-hash function. In a variant, the instance key is not a symmetric key, but a private key with optionally a certificate. The instance can use the private key to prove it is indeed the instance to the key server by signing a request such as for example data key requests. In another variant the authorization credential is not a key, but a software token or assertion, i.e. a statement signed by the key server that authorizes the instance and which can be presented to the key server later. In another variant the authorization credential is realized by an attribute-based key set. In such case the instance obtains a set of keys where each key is associated to a particular attribute such as a role. The instance subsequently presents a subset of the keys to the key server, for example in a data key request. The presented keys are used by the key server to efficiently handle requests enabling a finer granularity than a single key per instance.

Application of the techniques disclosed herein may be in the area of cloud computing and specifically applications that require stronger data protection such as healthcare cloud applications that involve personal health information (PHI).

A method may be provided to protect data in cloud computing involving encryption of data objects with a step where a virtual machine instance sends a key request to a key server and if the virtual machine instance is authorized then the key server responds with the decryption key for the encrypted data object. This method may be extended to first personalize and authorize the virtual machine instance with a step where the virtual machine instance sends a personalization request to the key server and the key server responds with personalized identity and authorization key. The method may be extended to include user-dependent authorization with a step where the key request includes a user credential and the key server evaluates the authorization of the user in relation to the data for which the key is requested. The method may be extended to prevent theft and unauthorized instantiations of a virtual machine image with a step where a cloud user pre-authorizes a new virtual machine instance by registering it at the key server, and the key server verifies the presence of the authorization before processing further requests from the virtual machine instance. The method may be extended to prevent cloning of virtual machine instances with a step where the personalized virtual machine instance includes a sequence number in the key request and the key server verifies that the sequence numbers are strictly monotonic increasing before responding to the key request. The method may be extended to prevent cloning and making snapshots at rest with a step where a cloud user sends a lock request to the cloud server to disable persistent storage or copy of the virtual machine instance. The method may be extended to trace and control operations of virtual machine instances with a step where the key server logs virtual machine operations such as instance registrations, personalization requests and key requests. The method may be extended to prevent data objects from being moved, used or accessed outside the allowed location region with a step where the key server obtains location information of the virtual machine instance and uses this information in the evaluation to return the requested key.

As part of determining/evaluating by the key server system 6 whether the data key request should be honored, a risk assessment may be performed to determine the legitimacy of the request (e.g. if the instance does not request an absurd number of data keys other than its regular pattern, which could point to the fact that it has been compromised). It uses its logging for this.

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a flash drive or a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for executing a virtual machine instance, comprising:
    a computer programmed to create a virtual machine instance running on the computer, wherein the virtual machine instance is programmed to:
    issue a request for an instance authorization credential, wherein the request is indicative of at least one attribute that is specific to the virtual machine instance;
    receive an instance authorization credential created externally of the virtual machine instance in response to the request for an instance authorization credential, wherein the instance authorization credential is uniquely associated with the virtual machine instance;
    generate a request for a data key, based on the instance authorization credential associated with the virtual machine instance, and receive the data key; and
    decrypt a data item based on the data key.

2. The system according to claim 1, wherein the virtual machine instance is further programmed to obtain a user credential associated with a user or a group of users, and wherein the virtual machine instance is programmed to generate the request for the data key further based on the user credential or is programmed to decrypt the data item further based on the user credential.

3. A system for executing a virtual machine instance, comprising:
a computer programmed to create a virtual machine instance running on the computer, wherein the virtual machine instance is programmed to:
issue a request for an instance authorization credential, wherein the request is indicative of at least one attribute that is specific to the virtual machine instance, and receive the instance authorization credential created externally of the virtual machine instance, wherein the instance authorization credential is uniquely associated with the virtual machine instance;
generate a request for a data key, based on the instance authorization credential associated with the virtual machine instance, and receive the data key; and
decrypt a data item based on the data key; and
wherein an authorization code associated with the virtual machine instance is registered at a key server and the authorization code is provided to the virtual machine instance;
wherein said at least one attribute is indicative of the authorization code.

4. The system according to claim 3, wherein the computer receives an instruction comprising the authorization code, and wherein the computer is programmed to create the virtual machine instance and provide the authorization code to the virtual machine instance in response to receiving the instruction.

5. The system according to claim 1, wherein the virtual machine instance is further is programmed to include in the request for the data key a code that is indicative of a position of the request in a sequence of requests issued by the virtual machine instance.

6. The system according to claim 1, wherein the virtual machine instance is configured to keep the data key and/or data decrypted using the data key in a volatile memory and/or configured to erase the data key and the data decrypted using the data key after use.

7. A key server system for issuing keys to a virtual machine instance, comprising:
a server computer programmed to:
receive a request for an instance authorization credential from a virtual machine instance, wherein the request is indicative of at least one attribute that is specific to the virtual machine instance;
verify a validity of the virtual machine instance based on the at least one attribute that is specific to the virtual machine instance;
determine an instance authorization credential, and uniquely associate the instance authorization credential with the virtual machine instance, the instance authorization determiner being external of the virtual machine instance;
provide the instance authorization credential to the virtual machine instance running on a computer;
receive a request for a data key from the virtual machine instance running on the computer, wherein the request for the data key comprises an instance authorization component associated with the instance authorization credential and the data key is usable by the virtual machine instance to decrypt a data item;
determine whether the virtual machine instance is authorized to receive the data key based on the instance authorization component; and
provide the data key to the virtual machine instance running on the computer if the virtual machine instance is authorized to receive the data key.

8. The key server system according to claim 7, wherein the server computer is programmed to perform the determining whether the virtual machine instance is authorized to receive the data key further based on the location of the virtual machine instance; or is programmed to perform the verifying of the validity of the virtual machine instance further based on an attribute indicative of a location of the virtual machine instance.

9. The key server system according to claim 7,
wherein the request for the data key is further indicative of a user credential that is associated with a user or a group of users of the virtual machine instance, and
wherein the server computer is programmed to perform the determining whether the virtual machine instance is authorized to receive the data key further based on the indication of the user credential received with the request for the data key and an access policy of the data protected by the data key.

10. A non-transitory storage medium storing a virtual machine image capable of being instantiated as a virtual machine instance running on a computer, wherein the virtual machine image comprises:
instruction code for causing the virtual machine instance to issue a request for an instance authorization credential, wherein the request is indicative of at least one attribute that is specific to the virtual machine instance, and to receive an instance authorization credential created externally of the virtual machine instance in response to the request for an instance authorization credential, wherein the instance authorization credential is uniquely associated with the virtual machine instance;
instruction code for causing the virtual machine instance to generate a request for a data key, based on the instance authorization credential associated with the virtual machine instance, and for receiving the data key; and
instruction code for causing the virtual machine instance to decrypt a data item based on the data key.

11. A method of executing a virtual machine instance on a computer, the method comprising performing, by the virtual machine instance, operations including:
issuing a request for an instance authorization credential, wherein the request is indicative of at least one attribute that is specific to the virtual machine instance;
receiving an instance authorization credential in response to the request for an instance authorization credential, wherein the instance authorization credential is uniquely associated with the virtual machine instance and the virtual machine instance does not perform any operation that creates or contributes to the creation of the instance authorization credential;
generating a request for a data key, based on the instance authorization credential associated with the virtual machine instance, and receiving the data key; and
decrypting a data item based on the data key.

12. A method of issuing keys to a virtual machine instance, comprising:
receiving a request for an instance authorization credential from a virtual machine instance, wherein the request is indicative of at least one attribute that is specific to the virtual machine instance;
identifying the virtual machine instance based on the at least one attribute that is specific to the virtual machine instance;
determining an instance authorization credential generated externally of the virtual machine instance, and uniquely associating the instance authorization credential with the virtual machine instance, wherein the virtual machine instance does not contribute to the determining of the instance authorization credential;

providing the instance authorization credential to the virtual machine instance running on a computer;

receiving a request for a data key from the virtual machine instance running on the computer, wherein the request for the data key comprises an instance authorization component associated with the instance authorization credential and the data key is usable by the virtual machine instance to decrypt a data item;

determining whether the virtual machine instance is authorized to receive the data key based on the instance authorization component; and providing the data key to the virtual machine instance running on the computer if the virtual machine instance is authorized to receive the data key.

13. The system according to claim 1, wherein the computer is a distributed or cloud computing system.

* * * * *